(No Model.)
T. FOWLER.
SPOKE SOCKET.
No. 286,192. Patented Oct. 9, 1883.
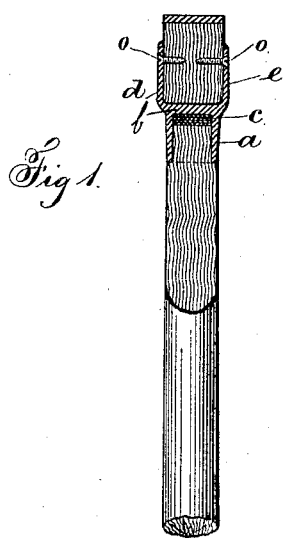
Fig. 1.
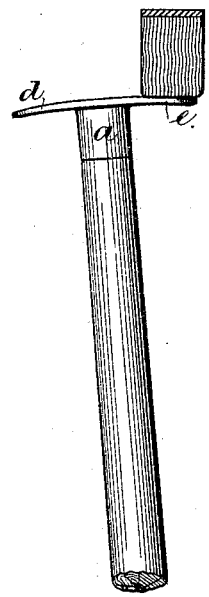
Fig. 3.
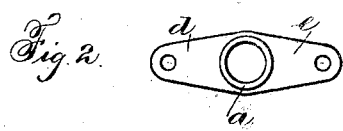
Fig. 2.
Fig. 4.
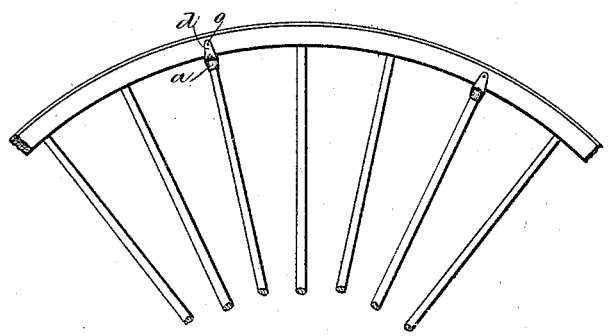
Witnesses
Harold Serrell
Chas H Smith
Inventor
Thaddeus Fowler
per Lemuel W Serrell
atty

UNITED STATES PATENT OFFICE.

THADDEUS FOWLER, OF SEYMOUR, CONNECTICUT.

SPOKE-SOCKET.

SPECIFICATION forming part of Letters Patent No. 286,192, dated October 9, 1883.

Application filed June 4, 1883. (No model.)

*To all whom it may concern:*

Be it known that I, THADDEUS FOWLER, of Seymour, in the county of New Haven and State of Connecticut, have invented an Improvement in Spoke-Sockets for Wheels, of which the following is a specification.

Spoke-sockets have been made of metal to set upon the ends of the spokes, and each provided with a flange that rests against the side of the felly. These, however, are usually heavy, and require a screw to keep them in place.

My improved spoke-socket is made of malleable metal, with two wings at the base of the socket. The socket is to be driven upon the end of the spoke, and one of the wings is inclined so that it may act as a wedge in distending the felly and tightening the wheel. The wings are then bent up at the two sides of the felly, so as to retain the socket at its proper place on the felly. This device is especially useful in repairing wheels where the tenon of the spoke has broken into the felly, as frequently occurs. By the use of this socket the spoke can be connected to the felly in a few minutes as firmly as in a new wheel, and the felly is tightened up without taking the wheel apart or inserting a new spoke, as is usually done.

In the drawings, Figure 1 is a section of the spoke, socket, and felly as in position for use. Fig. 2 is a plan view of the spoke, socket, and wings as spread. Fig. 3 is an elevation of the spoke and socket and section of the felly previous to the spoke being driven back to place, and Fig. 4 is an elevation of a section of a wheel.

The socket $a$ is of a size adapted to receive the end of the spoke. Usually such end will require to be cut on the sides to reduce its diameter; but the spoke should fit the socket very tightly, so that the socket requires to be driven upon the spoke. If the thickness of the bottom $b$ of the socket is not sufficient to fill the space between the end of the spoke and the inside of the felly, one or more disks, $c$, are to be introduced into the socket. The wings $d$ and $e$ extend out at opposite sides of the bottom of the socket, and they are to be of a suitable shape, and preferably thinnest at the edges. These wings will usually be cast flat, as seen in Fig. 2, and the entire socket is of malleable metal, preferably of malleable cast-iron, so that one of the wings can be bent at an inclination, as shown, to form a wedge to distend the felly.

It is to be understood that in repairing a wheel the end of the spoke is to be sprung aside from the felly and shaved down, and the socket driven upon the end of the spoke. When this has been done, the wing next to the felly is bent at the end sufficiently to pass within the felly, as shown, and upon driving the spoke back into place the wing acts as a wedge, and the socket distends the wheel by firmly wedging in between the end of the spoke and the inside of the felly. The wings $d$ $e$ are turned up at the respective sides of the felly by bending them. This is easily done by a hammer, and the felly is firmly grasped between the two wings. A screw or rivet may be introduced, as at $o$; but this will not always be necessary, as the wings grasp the felly very firmly.

If desired, one of the wings may be bent up before the socket is applied to the end of the spoke.

I do not herein claim a metallic spoke-socket into or through which the tenon of the spoke passes; nor do I claim branches at the sides of the socket to be bent up at the sides of the felly and provided with points to be driven into the wood. In my invention the spoke-socket is made with wings, one wing forming a wedge, which, in driving the spoke and socket into place, acts to distend the felly, the wings being bent down against the sides of the felly to hold the socket in place.

I claim as my invention—

The combination, with the spoke and felly, of a socket of malleable metal, and a wing upon each side of said socket, the socket being adapted to be driven upon the spoke, one wing to form a wedge, which, in driving the spoke and socket to place, acts to distend the felly, the wings being bent down against the sides of the felly to hold the socket in place, substantially as specified.

Signed by me this 28th day of May, A. D. 1883.

THADDEUS FOWLER.

Witnesses:
SHELDON CHURCH,
S. HART CULVER.